Nov. 18, 1930.  F. T. ZERWIG  1,782,085
WHEEL SCRAPER
Filed Sept. 25, 1929
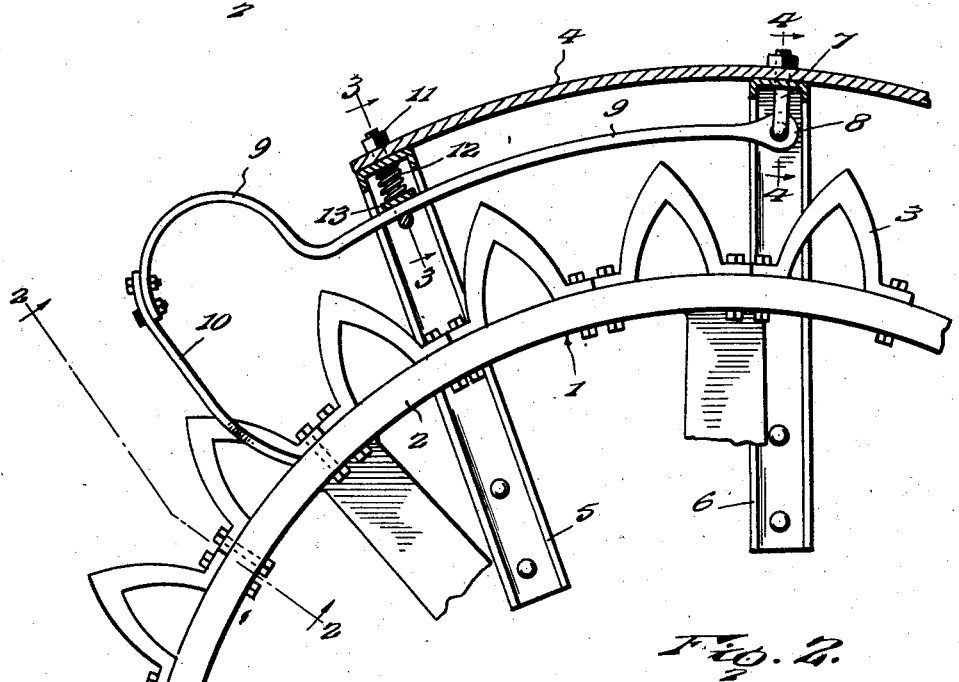
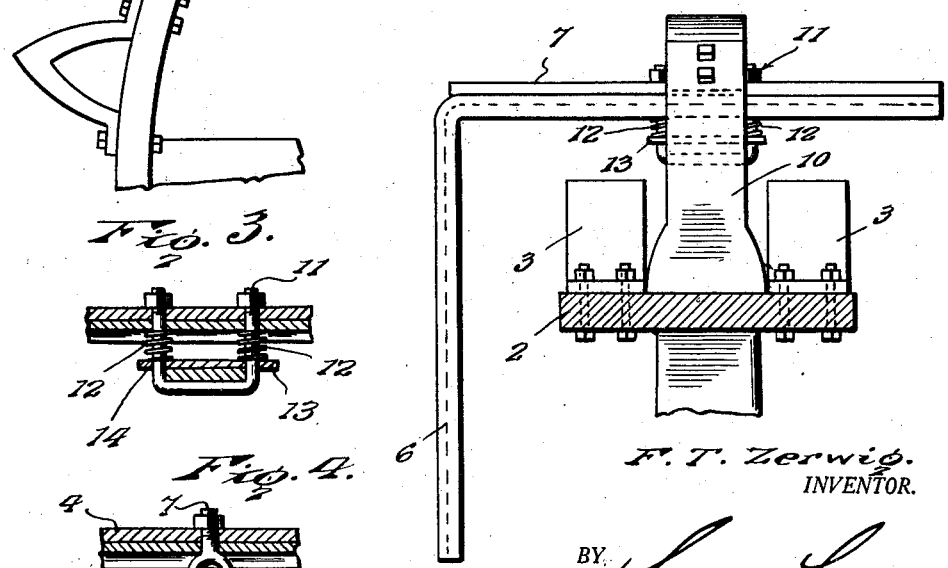
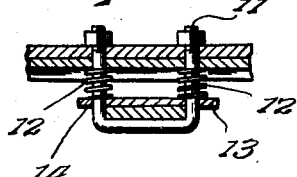
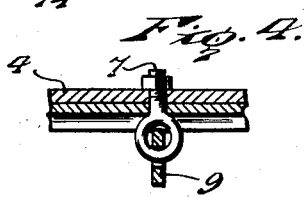
F. T. Zerwig.
INVENTOR.
BY Lacey & Lacey
ATTORNEYS Patented Nov. 18, 1930

1,782,085

UNITED STATES PATENT OFFICE

FRANK T. ZERWIG, OF STE. GENEVIEVE, MISSOURI

WHEEL SCRAPER

Application filed September 25, 1929. Serial No. 395,110.

The present invention is directed to improvements in wheel scrapers.

The primary object of the invention is to provide a device of this character so constructed that it can be conveniently attached to a tractor so that the wheels thereof will be maintained free from dirt which, as is well known, collects on the rims of tractor wheels and retards the effectiveness of the calks upon the wheels.

Another object of the invention is to provide a device of this character so constructed that it will be yieldably held in contact with the wheel rim and is disposed between the cleats thereof so that dirt or mud collecting upon the wheel will be effectively scraped therefrom.

Another object of the invention is to provide a device of this character which is simple in construction, easy to install, and one which is durable and can be manufactured at a minimum cost.

With these and other objects in view, this invention resides in the novel features of construction, formation, and combination and arrangement of parts to be hereinafter more fully described, claimed and illustrated in the accompanying drawings, in which:

Figure 1 is a fragmentary side view of a drive wheel of a tractor showing the device in position thereon.

Figure 2 is a sectional view on the line 2—2 of Figure 1.

Figure 3 is a sectional view on the line 3—3 of Figure 1.

Figure 4 is a sectional view on the line 4—4 of Figure 1.

Referring to the drawing, 1 designates a portion of a drive wheel of a conventional form of tractor, the rim 2 of which is provided with laterally spaced cleats 3.

The fender 4 is supported by braces 5 and 6 which are secured to the frame of the tractor, as customary. An eye bolt 7 is passed through the fender 4 and brace 6 and has pivotally connected thereto the eye 8 of the arm 9, said arm having at one end thereof, a loop 9' and to which is bolted the scraping blade 10, said blade having its lower edge arranged for movement in the space between the cleats 3, as clearly shown in Figure 2 of the drawing. In order to hold the scraping blade 10 in yielding contact with the rim 2, a U-bolt 11 is provided, the arms of which are passed through the brace 5 and fender 4, said arms being encircled by springs 12 which bear upon a plate 13 having openings 14 therein for slidably engaging the arms of the bolt. The arm 9 is engaged between the bight portion of the bolt 11 and plate 13, and it will be obvious that the springs 12 will tend to urge the arm 9 downwardly in order that the scraping edge of the blade 10 will be held in yielding contact with the rim 2 so that during movement of the wheel, the dirt which may collect upon the rim thereof and between the cleats will be effectively scraped therefrom. It will thus be seen that any mud or grass which may collect upon the rim of the wheel and between the cleats thereof, will be scraped therefrom so that the cleats will be permitted to penetrate the earth for their entire depth, thus materially increasing the traction power thereof.

From the foregoing it is thought that the operation, and many advantages of the herein described invention will be apparent to those skilled in the art without further description, and it will be understood that various changes in the size, shape, proportion, and minor details of construction may be resorted to without departing from the spirit or sacrificing any of the advantages of the invention.

What is claimed is:

The combination with a traction wheel, and braces at the side thereof having portions extending across the rim of the wheel in spaced relation thereto, of an arm disposed between the rim of the wheel and the overhanging portions of the braces and pivoted at one end to one of the braces, and having its opposite end curved outwardly, thence inwardly, a scraping blade attached to the recurved end of the arm and engaging the rim of the wheel, a U-bolt having its closed end engaging under and its arms embracing the sides of the pivoted arm and passing through the overhanging portion of the other brace, a plate loosely mounted on the arms of the U-bolt and engaging the outer side of the pivoted arm, and springs on the arms of the U-bolt between the brace and plate to yieldably hold the scraper blade in contact with the rim of the traction wheel.

In testimony whereof I affix my signature.

FRANK T. ZERWIG. [L. S.]